United States Patent
Moran et al.

(10) Patent No.: US 7,057,868 B2
(45) Date of Patent: Jun. 6, 2006

(54) REVERSE CURRENT PROTECTION DEVICE

(75) Inventors: Brian Douglas Moran, San Diego, CA (US); Ailen Villegas Quintana, National City, CA (US); Michael David Wilk, Temecula, CA (US)

(73) Assignee: ISE Corporation, Poway, CA (US)

( * ) Notice: Subject to any disclaimer, the term of this patent is extended or adjusted under 35 U.S.C. 154(b) by 304 days.

(21) Appl. No.: 10/364,868

(22) Filed: Feb. 10, 2003

(65) Prior Publication Data

US 2004/0125518 A1    Jul. 1, 2004

Related U.S. Application Data

(60) Provisional application No. 60/436,524, filed on Dec. 26, 2002.

(51) Int. Cl.
*H02H 3/18* (2006.01)

(52) U.S. Cl. .......................... 361/83; 307/86

(58) Field of Classification Search .............. 361/23; 307/87, 86
See application file for complete search history.

(56) References Cited

U.S. PATENT DOCUMENTS

| | | | |
|---|---|---|---|
| 4,707,759 A * | 11/1987 | Bodkin | 361/48 |
| 5,075,813 A * | 12/1991 | Takabayashi | 361/84 |
| 6,157,308 A * | 12/2000 | Byers | 340/635 |
| 6,777,909 B1 * | 8/2004 | Aberle et al. | 320/104 |
| 6,800,962 B1 * | 10/2004 | Bahl et al. | 307/52 |
| 6,838,923 B1 * | 1/2005 | Pearson | 327/309 |
| 2003/0113599 A1 * | 6/2003 | Pearson | 429/23 |

FOREIGN PATENT DOCUMENTS

| | | |
|---|---|---|
| JP | 03273834 A * | 12/1991 |
| JP | 05143205 A * | 6/1993 |

* cited by examiner

*Primary Examiner*—Stephen W. Jackson
*Assistant Examiner*—Boris Benenson
(74) *Attorney, Agent, or Firm*—Stephen C. Beuerle; Procopio Cory Hargreaves & Savitch LLP

(57) ABSTRACT

A reverse current protection device includes one or more contactors in a power circuit that open to prevent current flow and close to allow current flow; an impedance buffer to invert voltage across the diode; a threshold detector to compare inverted voltage to a reference voltage to determine a good or fault diode condition; an opto-isolator actuatable by the threshold detector when at least one of a good diode condition is determined and a fault diode condition is determined; and a relay in communication with the opto-isolator to cause at least one of the one or more contantors to close in a good diode condition and open in a fault diode condition.

18 Claims, 4 Drawing Sheets

REVERSE CURRENT PROTECTION DEVICE

CROSS REFERENCE TO RELATED APPLICATIONS

This application claims the benefit of provisional application 60/436,524, filed on Dec. 26, 2002, under 35 U.S.C. 119(e).

FIELD OF THE INVENTION

The field of the invention relates, in general, to system and methods for protecting direct current (DC) high power sources from reverse current damage, and, in particular, to systems and methods for protecting fuel cells in buses or other vehicles from reverse current damage.

BACKGROUND OF THE INVENTION

Various computers are usually employed in monitoring and control systems associated with high power sources. Conceptually, sensing and actuation devices interfaced to a computer as controlled by the computer software could provide reverse current protection. However, the response time of such a system is generally considered as not fast or reliable enough to provide the desired level of protection.

It is common to use a diode to allow electric current to flow in one direction but not the other. Furthermore, it is common to use diodes to isolate and effectively "OR" DC power sources connected in parallel. High current power sources are often expensive and may be dangerous if damaged or destroyed. If a reverse current protection diode fails in a "shorted" condition, protection of the power source is lost.

A bus fuel cell used to power an electric motor of a bus supplies high-current, high-voltage power to the electric motor through output power wiring. The output power wiring works in parallel with battery energy storage to supply power to an inverter that controls and powers the electric motor that propels the bus. If any condition arises that causes a reverse current into the fuel cell, significant and very expensive damage to the fuel cell may occur. To prevent this, a high current (e.g., 400 amp) diode may be used in series with the fuel cell power circuit. However, as mentioned above, if the diode fails, the expensive fuel cell is no longer protected from reverse-current damage.

SUMMARY OF THE INVENTION

A reverse current protection device was developed by the present inventors to sense for a "shorted" diode condition and provide protection for the fuel cell in addition to the diode because of the potential consequences of reverse-current damage to a fuel cell. The protected fuel cell may be mounted in a bus and used in parallel with a battery energy storage system to supply power for the electric motor that propels the bus. The reverse current protection device may also be used to provide an additional layer of protection against accidental reverse-current damage for other mobile and fixed fuel cell applications, and other types of power sources susceptible to reverse-current damage.

An aspect of the invention involves a reverse current protection device designed as, but not limited to, a fuel cell diode check circuit. The circuit senses a healthy diode from its forward current voltage drop. When a forward current voltage drop exists, a "good" condition is sensed, amplified, and used to maintain closure on a high current relay, called a "contactor", that is connected in series with the high current power bus. Conversely, if no forward voltage exists, a "fault" condition is sensed and the contactor is opened to prevent current flow in the power circuit. For the purpose of sensing forward current flow, a resistor could function as well as a diode, but the nonlinear voltage-current characteristics of the diode together with the fuel cell diode check circuit provide protection against reverse current damage for the fuel cell.

A "start up override delay" signal is part of the start up sequence until the power current starts flowing as a means to sense voltage drop. The start up override delay may be supplied by a simple RC time delay that times out before the sensing of the diode voltage drop. Prior to the start up override delay the start up sequence may include a preliminary sensing of other circuit voltage and/or impedance levels to protect against other possible faults caused by incorrect installation, accident, software bug, or other hardware component failure. The preliminary sensing may be implemented by hard wire circuit connections or by sensing devices connected to a computer and controlled by the computer software.

Another aspect of the invention involves a method of protecting a fuel cell of a power circuit from damage caused by reverse current into the fuel cell caused by a faulty diode. The power circuit may power an electric motor of a bus for propelling the bus. The method includes providing a contactor in the power circuit that opens to prevent current from flowing therethrough and closes to allow current to flow therethrough; measuring the voltage across the diode to determine if the diode is in a good condition or a fault condition; causing the contactor to be closed if the diode is in a good condition so that current flows from the fuel cell through the diode and the contactor to the electric motor to propel the bus; and causing the contactor to be opened if the diode is in a fault condition so that current does not flow through the contactor, protecting the fuel cell from damage caused by reverse current through the diode and into the fuel cell.

A further aspect of the invention involves a reverse current protection device for a fuel cell of a power circuit for protecting the fuel cell from damage caused by reverse current into the fuel cell caused by a faulty diode. The power circuit may power an electric motor of a bus for propelling the bus. The reverse current protection device includes means in the power circuit for opening the power circuit to prevent current from flowing therethrough and for closing the power circuit to allow current to flow therethrough; means for measuring the voltage across the diode to determine if the diode is in a good condition or a fault condition; means for causing the power circuit opening and closing means to be closed if the diode is in a good condition so that current flows from the fuel cell to the electric motor to propel the bus; and causing the power circuit opening and closing means to be opened if the diode is in a fault condition so that current does not flow through the power circuit opening and closing means, protecting the fuel cell from damage caused by reverse current through the diode and into the fuel cell.

A still further aspect of the invention involves a reverse current protection device for a fuel cell of a power circuit for protecting the fuel cell from damage caused by reverse current into the fuel cell caused by a faulty diode. The power circuit may power an electric motor of a bus for propelling the bus. The reverse current protection device includes a contactor in the power circuit that opens to prevent current from flowing therethrough and closes to allow current to flow therethrough; an impedance buffer to invert the voltage across the diode; a threshold detector to compare the inverted voltage to a reference voltage to determine if the diode is in a good or fault condition; an opto-isolator actuatable by the threshold detector when at least one of a good diode condition is determined or a fault diode condition is determined; and a relay in communication with the opto-isolator to cause at least one of the contactor to close in a good diode condition so that power is supplied to the electric motor to propel the bus or open in a fault diode condition for protecting the fuel cell from damage caused by reverse current into the fuel cell caused by a faulty diode.

It is therefore an object of the present invention to protect direct current (DC) high power sources from reverse current damage to associated electrical components. It is a further object of this invention to protect expensive fuel cell components form reverse current damage.

An even further object of the invention is to protect expensive fuel cell components from inadvertent electrical power surges in the reverse direction due to incorrect installation, accident, software bug, or other hardware component failure.

Lastly, it is an object of the present invention to advance and protect the technology of the fuel cell used in the automobile industry, especially the bus and mass transit industry.

These together with other objects and advantages which become subsequently apparent reside in the details of the construction and operation as more fully hereinafter described and claimed, reference being had to the accompanying drawings forming a part thereof, wherein like numerals refer to like parts throughout.

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF PREFERRED EMBODIMENTS

Figure 1:
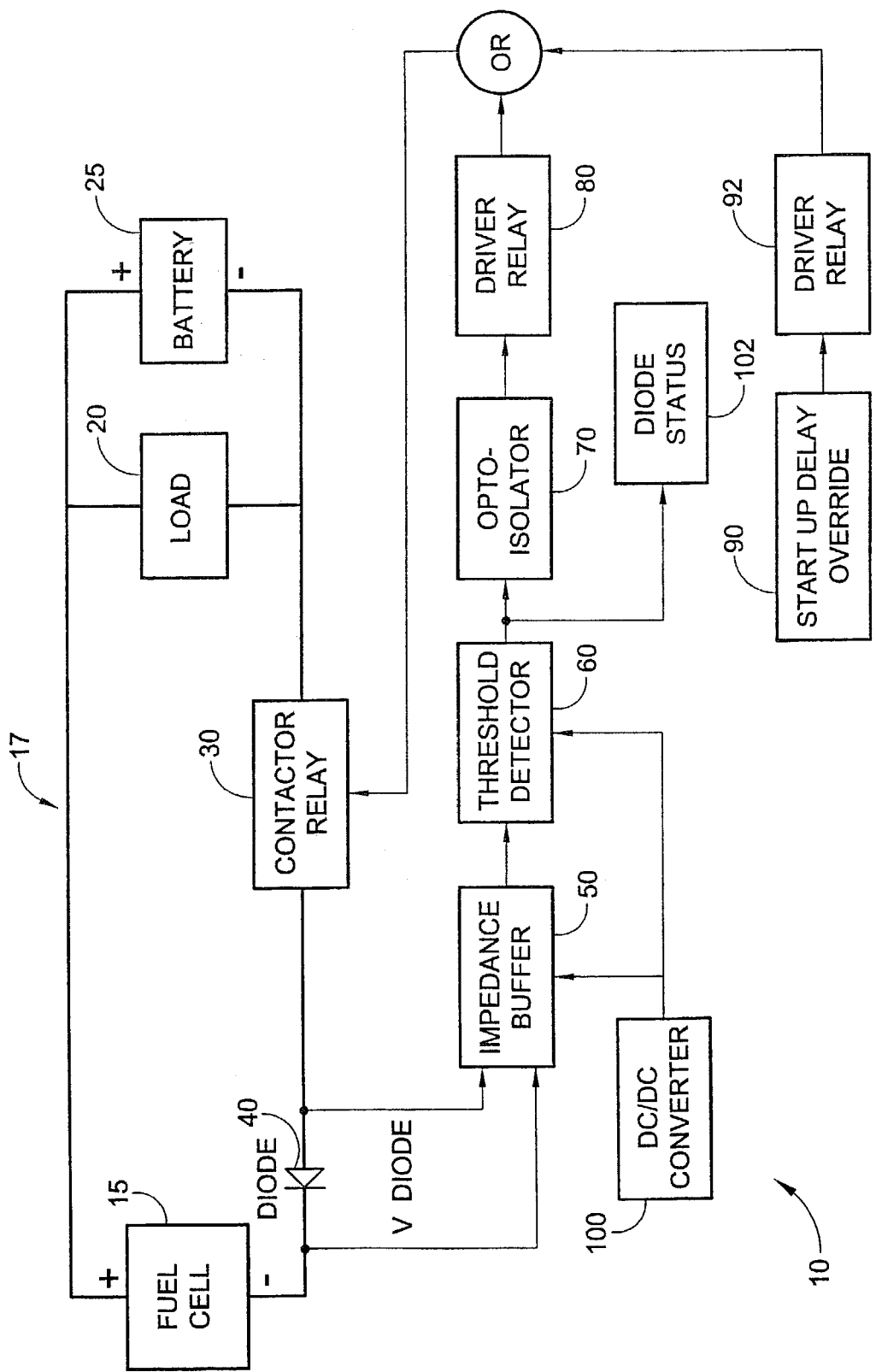
FIG. 1 is a block diagram of an embodiment of a reverse current protection device for a fuel cell diode.
Figure 2:
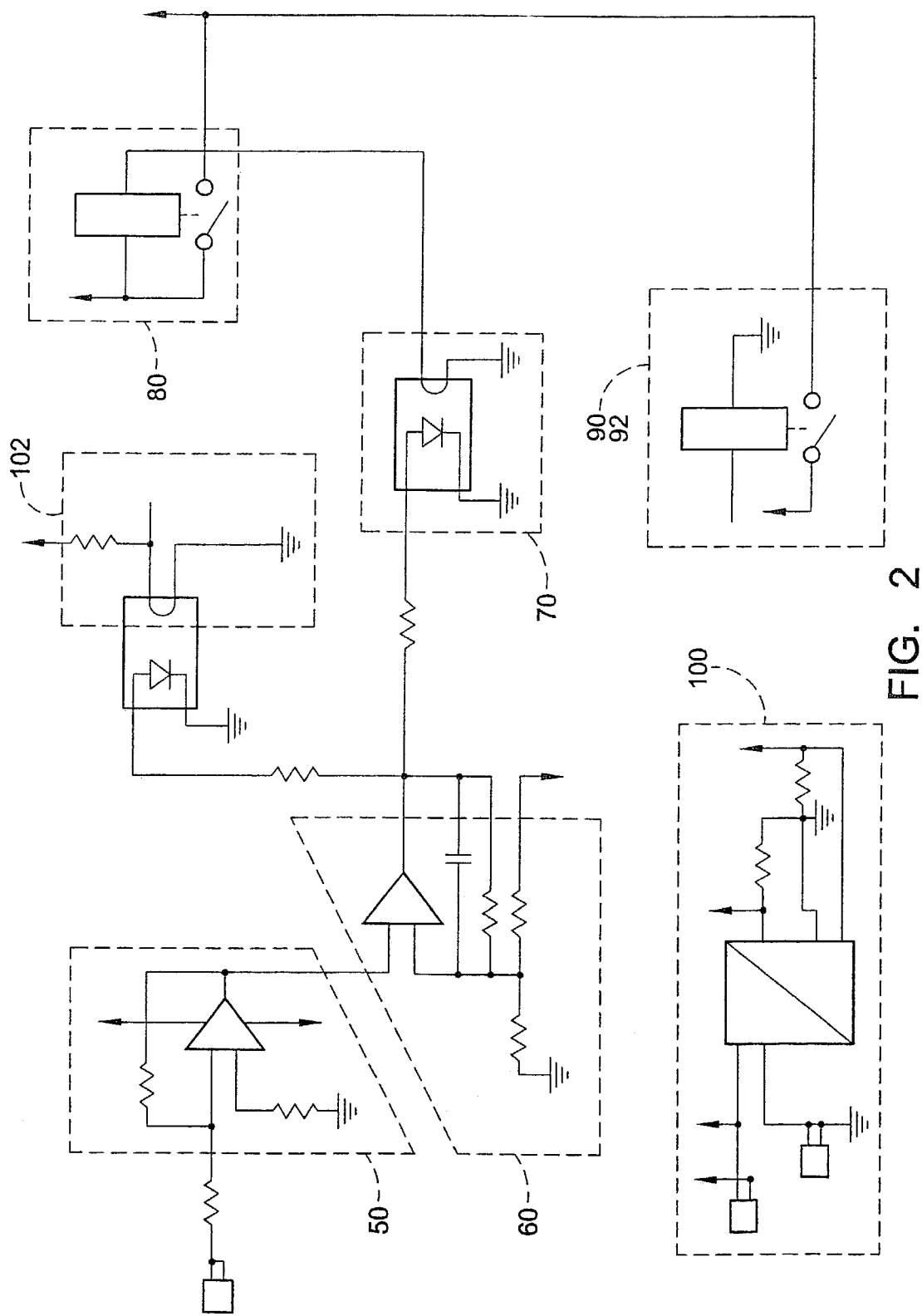
FIG. 2 is a circuit schematic of the reverse current protection device of FIG. 1.

With reference to FIGS. 1 and 2, an embodiment of a reverse current protection device 10 for protecting a fuel cell 15 of a bus will now be described. Although the reverse current protection device 10 is described as protecting a fuel cell 15 of a bus, the reverse current protection device 10 may be used to protect fuel cells used in other mobile and fixed applications and may be used to protect power sources other than fuel cells.

The fuel cell 15 is part of a power circuit 17 for supplying power in the form of high current at high voltage to a load 20. In the embodiment shown, the fuel cell 15 is a bus fuel cell sold by UTC Fuel Cells of South Windsor, Conn. Although a single fuel cell 15 is shown, in an alternative embodiment, the power circuit 17 may include multiple fuel cells 15 with multiple protection devices 10. The output power wiring for the fuel cell 15 may work in parallel with an active load such as a battery 25 to supply power to an inverter (not shown) that controls and powers the load 20. In an alternative embodiment, additional or alternative active loads such as a dc/dc converter, a battery charger, or another battery may be part of the power circuit 17. In the embodiment shown, the load 20 is an electric motor that propels the bus.

If any condition arises, including but not limited to, incorrect installation, accident, software bug, or other hardware component failure, that causes a reverse current into the fuel cell 15, significant and very expensive damage to the fuel cell 15 may occur. To prevent this, a high power diode 40 in a negative return line to the fuel cell 15 or anywhere in series with the fuel cell power circuit 17 may be used to protect the fuel cell 15 against reverse current. In the embodiment shown, the diode 40 is a high-current power diode that typically operates with a forward current rating of 400 amps. As used herein high-current power diodes are power diodes with a forward current rating of at least 30 amps. Reverse current could inadvertently occur, for example, because of some over-voltage of the battery 25, some other power source connected in parallel, incorrect installation, accident, software bug, or other hardware component failure.

Referring to FIGS. 1 and 2, the reverse current protection device 10 includes an impedance buffer 50 and a threshold detector 60 designed using a dual operational amplifier integrated circuit which requires the + and − voltage for power as provided by a dc/dc converter 100. The impedance buffer 50 acquires and inverts the voltage Vdiode across the diode to an inverted voltage V1. The threshold detector 60 compares the inverted voltage V1 a reference voltage derived by a resistor divider pair across a voltage provided by the dc/dc converter 100. When Vdiode exceeds the reference voltage, the threshold detector 60 outputs a voltage that indicates that the diode 40 is good at a diode status indicator 102 (e.g., LED) and also drives a relay 80 through an opto-isolator 70 that, in turn, causes a contactor or contactor relay 30 to close the power circuit 17 and allow power from the fuel cell 15 to be delivered to the load 20. The opto-isolator 70 isolates the high-voltage power ground from the low-voltage signal ground. The driver relay 80 provides sufficient current to operate the 400 amp contactor relay 30.

When first powering up the fuel cell 15, there is no current across the diode 40 and, therefore, no voltage drop. This would indicate a bad diode and not allow the contactor relay 30 to close and turn on the load circuit 20. A start up delay override circuit 90 and driver relay 92 may be used to close the contactor relay 30 at startup and allow current to flow. Once the power circuit 17 is in operation, the override signal is removed and the reverse current protection device 10 takes over to continuously monitor the diode condition. If a failed diode (e.g., short) fault occurs, the fuel cell 15 is at risk of damage from reverse current. The reverse current protection device 10 senses the fault within one millisecond and opens the contactor relay 30 within 30 milliseconds and removes the risk to the fuel cell 15 by turning off the power circuit 17. In alternative embodiments, the reverse current protection device 10 opens the contactor relay 30 in less than 30 milliseconds.

FIG. 2 is a circuit schematic of the reverse current protection device 10 of FIG. 1 and shows an embodiment of the integrated circuits, discrete resistors, and discrete capacitors that may make up the reverse current protection device 10. The capacitors may be added to a feedback loop of the threshold detector 60 to provide a Schmidt-trigger effect to speed up and latch the threshold detector 60.

With reference to FIGS. 1, 2, 3, and 4, another embodiment of a reverse current protection device 98 for protecting a fuel cell 15 of a bus will be described. The reverse current protection device 98 includes first reverse current protection circuit 10A and second reverse current protection circuit 10B. If either circuit senses a diode 40 failure the contactor relay 30 will open to disconnect the fuel cell from the load 20 and battery 25 circuits. Thus, both of the sensing circuits would have to fail to allow a failed diode 40 to go undetected. Although dual reverse current protection circuits 10A, 10B are shown, the reverse current protection device 98 may include two or more reverse current protection circuits.

Figure 3:
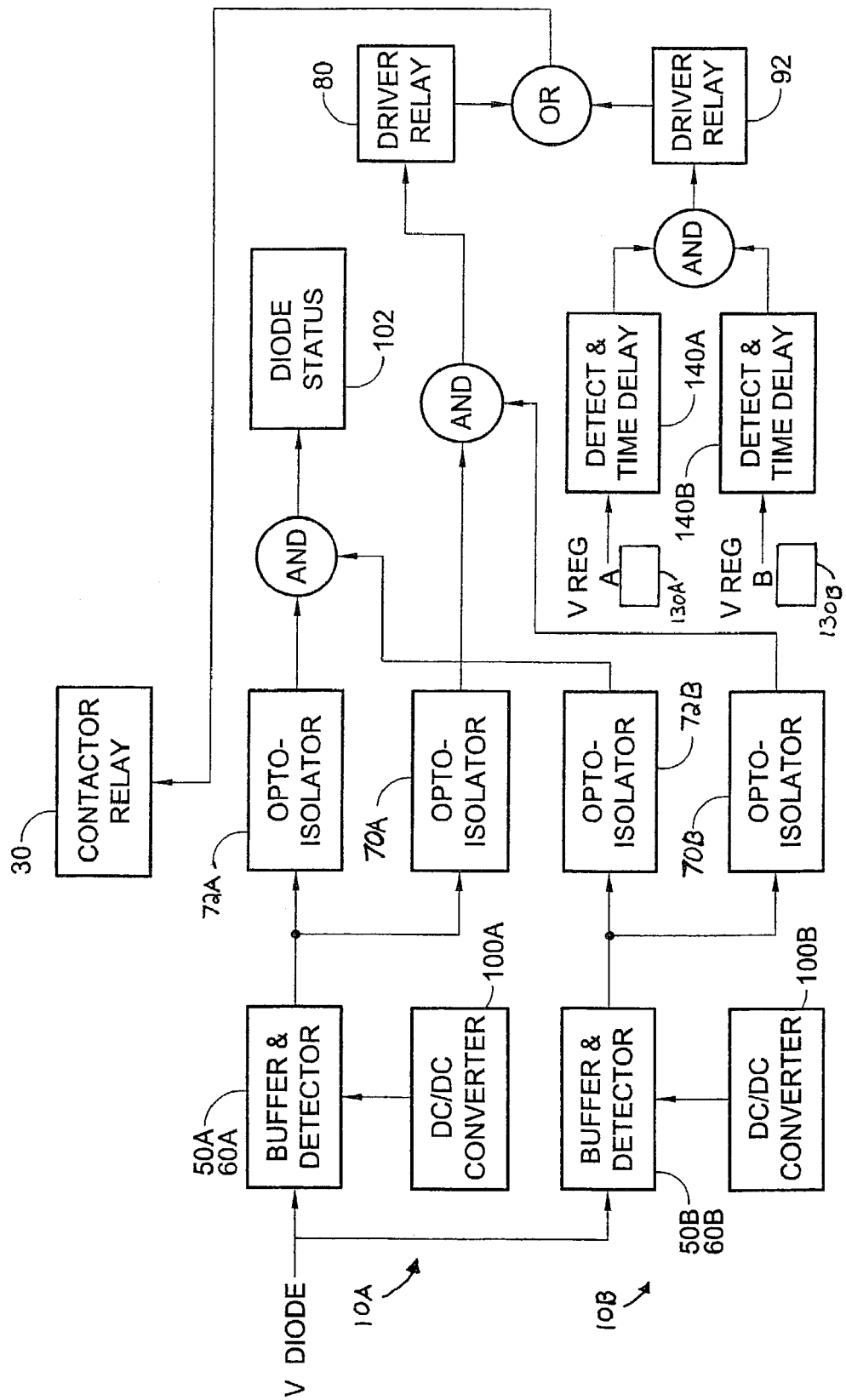
FIG. 3 is a block diagram of another embodiment of a reverse current protection device for a fuel cell diode where the reverse current protection device includes a sensing circuit.
Figure 4:
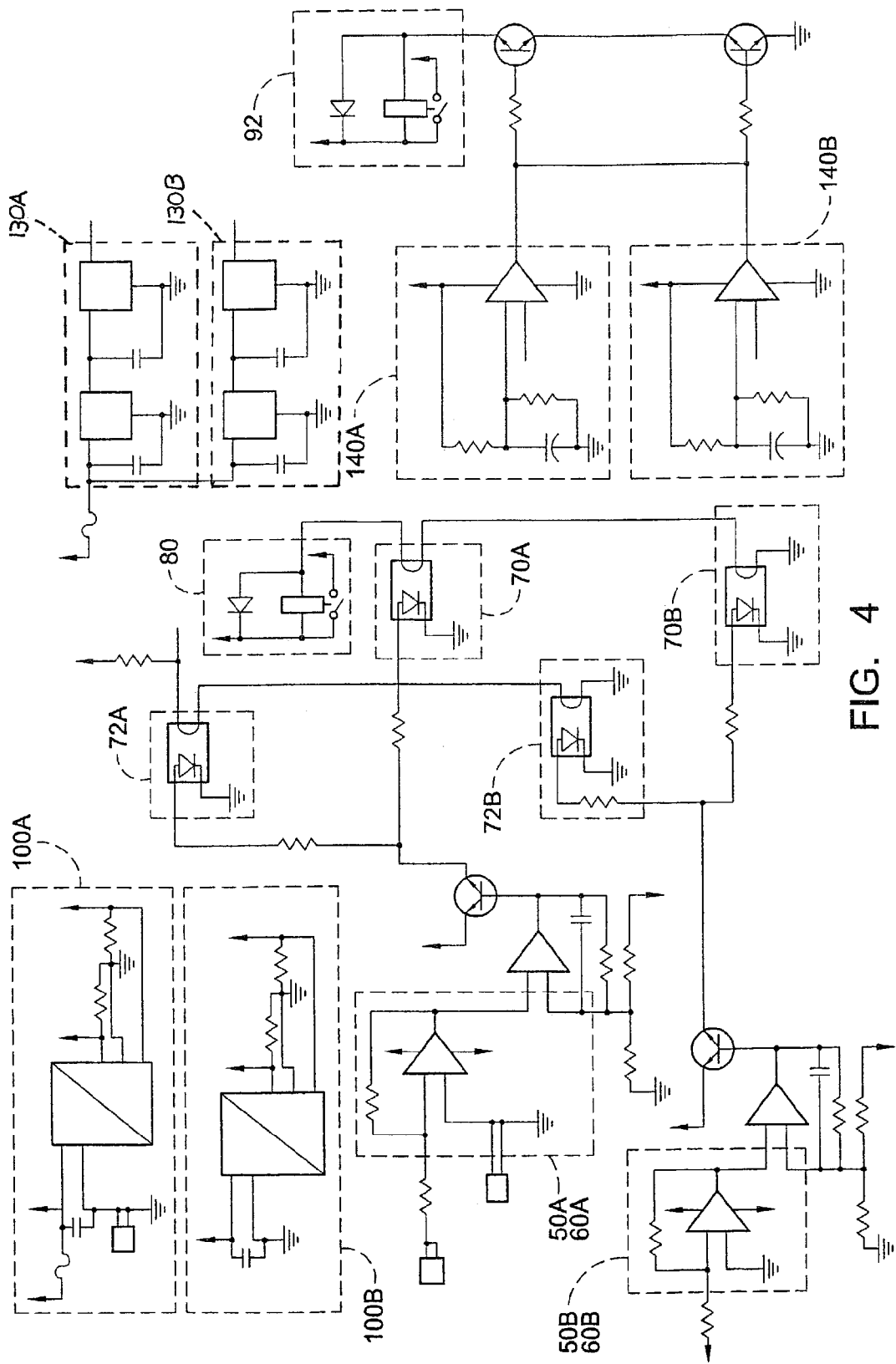
FIG. 4 is a circuit schematic of the reverse current protection device of FIG. 3.

With reference to FIGS. 3 and 4, the reverse current protection circuits 10A, 10B include impedance buffers 50A, B and threshold detectors 60A, B are designed using a dual operational amplifier integrated circuit that requires the + and − voltage for power as provided by the dc/dc converters 100A, B. The impedance buffers 50A, B acquire and invert the voltage Vdiode across the diode 40 to inverted voltage V1. The threshold detectors 60A, B compare the inverted voltage V1 to a reference voltage derived by a resistor divider pair. When V1 exceeds the reference voltage, the threshold detectors 60A, B output a voltage that indicates that the diode 40 is good and drive a driver relay 80 through opto-isolators 70A, AND 70B that, in turn, causes the contactor relay 30 to close the power circuit 17 and allow the fuel cell 15 to power the load 20. The opto-isolators 70A, B isolate the high-voltage power ground from the low-voltage signal ground. The driver relay 80 provides sufficient current to operate the 400 amp contactor relay 30. Second opto-isolators 72A, AND 72B, which are activated by the threshold detectors 60A, B when V1 exceeds the reference voltage, cause a diode status indicator 102 (e.g., LED) to indicate the diode 40 is good. As indicated above, when first powering up the fuel cell 15, there is no current across the diode 40 and therefore no voltage drop. This would indicate a bad diode and not allow the contactor relay 30 to close and turn on the load circuit 20. Detect and time delay circuits 140A, AND 140B and driver relay 92 are used to close the contactor relay 30 at startup and allow current to flow if a startup condition is detected by measuring VregA, VregB, the output voltages of voltage regulators 130A,B. Both startup circuits 140A AND 140B must operate correctly or else the contactor 30 will not close to connect the load 20 and battery 25 to the fuel cell. Once the power circuit 17 is in operation, the override signal is removed and the reverse current protection device 98 takes over to continuously monitor the diode condition. If a failed diode (e.g., short) fault occurs, the reverse current protection device 98 opens the contactor relay 30 and removes the risk to the fuel cell 15 by turning off the power circuit 17.

FIG. 4 shows a circuit schematic of the reverse current protection device 98 of FIG. 3 and shows an embodiment of all the components and connections to implement the functions of the reverse current protection device 98 of FIG. 3. The circuit of FIG. 4 may be installed on an operating fuel cell powered bus.

Thus, the reverse current protection device provides a double safety check system and method for sensing a short circuit fault condition of a reverse-current protection diode for a fuel cell and turns off or "opens" the fuel cell main power circuit in the event of a protection diode short circuit fault condition.

The reverse current protection device shown in the drawings and described in detail herein disclose arrangements of elements of particular construction and configuration for illustrating preferred embodiments of structure and method of operation of the present invention. For example, the circuit could be reduced to an integrated circuit that is enclosed within the contactor package. It is to be understood, however, that elements of different construction and configuration and other arrangements thereof, other than those illustrated and described may be employed for providing a reverse current protection device 10 in accordance with the spirit of this invention, and such changes, alterations and modifications as would occur to those skilled in the art are considered to be within the scope of this invention as broadly defined in the appended claims.

What is claimed is:

1. A method of protecting a fuel cell of a power circuit from damage caused by reverse current into the fuel cell caused by a faulty diode, the power circuit powering an electric motor of a vehicle for propelling the vehicle, comprising:

providing one or more contactors in the power circuit that open to prevent current from flowing therethrough and close to allow current to flow therethrough;

measuring the voltage across the diode to determine if the diode is in a good condition or a fault condition;

causing the one or more contactors to be closed if the diode is in a good condition so that current flows from the fuel cell through the diode and the contactor to the electric motor to propel the vehicle; and causing at least one of the one or more contactors to be opened if the diode is in a fault condition so that current does not flow through the contactor, protecting the fuel cell from damage caused by reverse current through the diode and into the fuel cell, wherein measuring the voltage across the diode to determine if the diode is in a good condition or a fault condition includes inverting the voltage across the diode with an impedance buffer, comparing the inverted voltage to a reference voltage with a threshold detector, and determining that the diode is in a good condition if the inverted voltage is greater than the reference voltage and determining that the diode is in a fault condition if the inverted voltage is less than the reference voltage.

2. The method of claim 1, wherein the electric motor is at least one of directly powered by the fuel cell and powered by the fuel cell via one or more intermediary components.

3. A method of protecting a fuel cell of a power circuit from damage caused by reverse current into the fuel cell caused by a faulty diode, the power circuit powering an electric motor of a vehicle for propelling the vehicle, comprising:

providing one or more contactors in the power circuit that open to prevent current from flowing therethrough and close to allow current to flow therethrough;

measuring the voltage across the diode to determine if the diode is in a good condition or a fault condition;

causing the one or more contactors to be closed if the diode is in a good condition so that current flows from the fuel cell through the diode and the contactor to the electric motor to propel the vehicle; and causing at least one of the one or more contactors to be opened if the diode is in a fault condition so that current does not flow through the contactor, protecting the fuel cell from damage caused by reverse current through the diode and into the fuel cell, wherein causing the one or more contactors to be closed if the diode is in a good condition includes causing an opto-isolator to drive relay that causes the one or more contactors to close.

4. The method of claim 3, wherein the electric motor is at least one of directly powered by the fuel cell and powered by the fuel cell via one or more intermediary components.

5. A method of protecting a fuel cell of a power circuit from damage caused by reverse current into the fuel cell caused by a faulty diode, the power circuit powering an electric motor of a vehicle for propelling the vehicle, comprising:
providing one or more contactors in the power circuit that open to prevent current from flowing therethrough and close to allow current to flow therethrough;
measuring the voltage across the diode to determine if the diode is in a good condition or a fault condition;
causing the one or more contactors to be closed if the diode is in a good condition so that current flows from the fuel cell through the diode and the contactor to the electric motor to propel the vehicle; and
causing at least one of the one or more contactors to be opened if the diode is in a fault condition so that current does not flow through the contactor, protecting the fuel cell from damage caused by reverse current through the diode and into the fuel cell,
further including providing an additional reverse current protection circuit to eliminate a false detection of reverse current.

6. The method of claim 5, wherein the electric motor is at least one of directly powered by the fuel cell and powered by the fuel cell via one or more intermediary components.

7. A reverse current protection device for a fuel cell of a power circuit for protecting the fuel cell from damage caused by reverse current into the fuel cell caused by a faulty diode, the power circuit powering an electric motor of a vehicle for propelling the vehicle, comprising:
means in the power circuit for opening the power circuit to prevent current from flowing therethrough and for closing the power circuit to allow current to flow therethrough;
means for measuring the voltage across the diode to determine if the diode is in a good condition or a fault condition;
means for causing the power circuit opening and closing means to be closed if the diode is in a good condition so that current flows from the fuel cell to the electric motor to propel the vehicle; and
causing the power circuit opening closing means to be opened if the diode is in a fault condition so that current does not flow through the power circuit opening and closing means, protecting the fuel cell from damage caused by reverse current through the diode and into the fuel cell, wherein means for measuring the voltage across the diode to determine if the diode is in a good condition or a fault condition include means for inverting the voltage across the diode, comparing the inverted voltage to a reference voltage, and determining that the diode is a good condition if the inverted voltage is greater than the reference voltage and determining that the diode is in a fault condition if the inverted voltage is less than the reference voltage.

8. The reverse current protection device of claim 7, wherein the electric motor is at least one of directly powered by the fuel cell and powered by the fuel cell via one or more intermediary components.

9. A reverse current protection device for a fuel cell of a power circuit for protecting the fuel cell from damage caused by reverse current into the fuel cell caused by a faulty diode, the power circuit powering an electric motor of a vehicle for propelling the vehicle, comprising:
means in the power circuit for opening the power circuit to prevent current from flowing therethrough and for closing the power circuit to allow current to flow therethrough;
means for measuring the voltage across the diode to determine if the diode is in a good condition or a fault condition;
means for causing the power circuit opening and closing means to be closed if the diode is in a good condition so that current flows from the fuel cell to the electric motor to propel the vehicle; and
causing the power circuit opening and closing means to be opened if the diode is in a fault condition so that current does not flow through the power circuit opening and closing means, protecting the fuel cell from damage caused by reverse current through the diode and into the fuel cell, wherein the reverse current protection device includes an additional reverse current protection means to eliminate false detection of reverse current.

10. The reverse current protection device of claim 9, wherein the electric motor is at least one of directly powered by the fuel cell and powered by the fuel cell via one or more intermediary components.

11. A reverse current protection device for a fuel cell of a power circuit for protecting the fuel cell from damage caused by reverse current into the fuel cell caused by a faulty diode, the power circuit powering an electric motor of a vehicle for propelling the vehicle, comprising:
one or more contactors in the power circuit that open to prevent current from flowing therethrough and close to allow current to flow therethrough;
an impedance buffer to invert the voltage across the diode;
a threshold detector to compare the inverted voltage to a reference voltage to determine if the diode is in a good or fault condition;
an opto-isolator actuatable by the threshold detector when at least one of a good diode condition is determined and a fault diode condition is determined; and
a relay in communication with the opto-isolator to cause at least one of the one or more contactors to close in a good diode condition so that power is supplied to the electric motor to propel the vehicle and open in a fault diode condition for protecting the fuel cell from damage caused by reverse current into the fuel cell caused by a faulty diode.

12. The reverse current protection device of claim 11, wherein the electric motor is at least one directly powered by the fuel cell and powered by the fuel cell via one or more intermediary components.

13. A method of protecting a fuel cell of a power circuit from damage caused by reverse current into the fuel cell caused by a faulty diode, the power circuit powering an electric motor of a vehicle for propelling the vehicle, comprising:
providing one or more contactors in the power circuit that open to prevent current from flowing therethrough and close to allow current to flow therethrough;
measuring the voltage across the diode to determine if the diode is in a good condition or a fault condition;
causing the one or more contactors to be closed if the diode is in a good condition so that current flows from the fuel cell through the diode and the contactor to the electric motor to propel the vehicle; and causing at least one of the one or more contactors to be opened if the diode is in a fault condition so that current does not flow through the contactor, protecting the fuel cell from damage caused by reverse current through the diode and into the fuel cell, wherein causing the one or more contactors to be opened if the diode is in a fault condition occurs in 30 milliseconds or less of when a fault condition of the diode is determined and the contactor drive signal occurs in 1 millisecond or less of when a fault condition of the diode is determined; and further including providing the one or more contactors in a closed condition for a predetermined period of time upon start up of the power circuit until the power circuit reaches a normal operating condition.

14. The method of claim 13, further including performing a start up sequence prior to providing the one or more contractors in a closed condition.

15. The method of claim 14, wherein the start up sequence includes preliminarily sensing at least one of other circuit voltages and impedance levels for abnormal conditions.

16. A reverse current protection device for a fuel cell of a power circuit for protecting the fuel cell from damage caused by reverse current into the fuel cell caused by a faulty diode, the power circuit powering an electric motor of a vehicle for propelling the vehicle, comprising:

means in the power circuit for opening the power circuit to prevent current from flowing therethrough and for closing the power circuit to allow current to flow therethrough;

means for measuring the voltage across the diode to determine if the diode is in a good condition or a fault condition;

means for causing the power circuit opening and closing means to be closed if the diode is in a good condition so that current flows from the fuel cell to the electric motor to propel the vehicle; and causing the power circuit opening and closing means to be opened if the diode is in a fault condition so that current does not flow through the power circuit opening and closing means, protecting the fuel cell from damage caused by reverse current through the diode and into the fuel cell, wherein means for causing the power circuit opening and closing means to be opened if the diode is a fault condition occurs in 30 milliseconds or less of when a fault condition of the diode is determined and the contactor drive signal occurs in 1 millisecond or less of when a fault condition of the diode is determined, further including means for providing the one or more contactors in a closed condition for a predetermined period of time upon start up of the power circuit until the power circuit reaches a normal operating condition.

17. The reverse current protection device of claim 16, further including means for performing a start up sequence prior to providing the power circuit opening and closing means in a closed condition.

18. The reverse current protection device of claim 17, wherein said means for performing a start up sequence include means for preliminarily sensing at least one of other circuit voltage and impedance levels for abnormal conditions.

* * * * *